April 20, 1943.  C. ORTEGA  2,316,885
AIRPLANE
Filed July 3, 1941  2 Sheets-Sheet 1
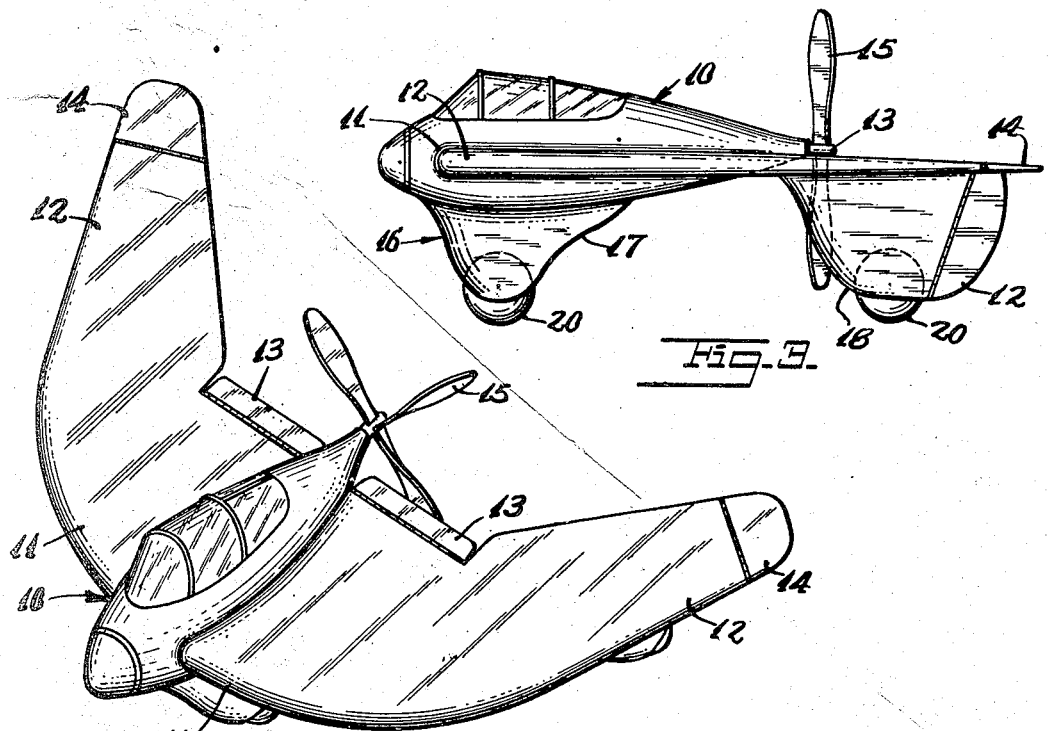
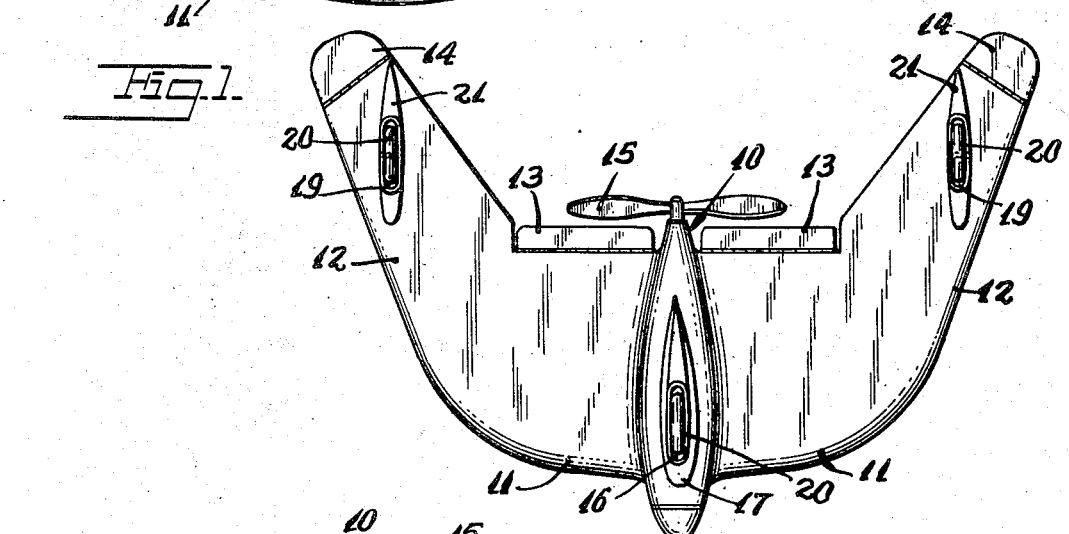
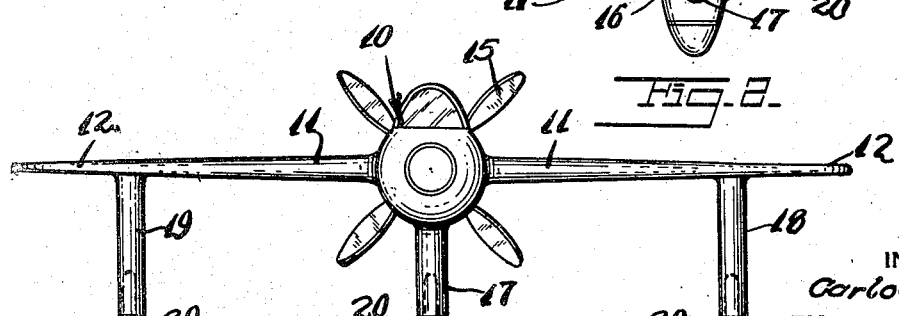
INVENTOR
Carlos Ortega
BY
ATTORNEY April 20, 1943.   C. ORTEGA   2,316,885

AIRPLANE

Filed July 3, 1941   2 Sheets-Sheet 2

INVENTOR
Carlos Ortega
BY
ATTORNEY

Patented Apr. 20, 1943

2,316,885

UNITED STATES PATENT OFFICE 2,316,885

AIRPLANE

Carlos Ortega, New York, N. Y.

Application July 3, 1941, Serial No. 400,883

6 Claims. (Cl. 244—13)

This invention relates to new and useful improvements in airplanes.

More particularly, the invention proposes a tail-less, nose dive proof airplane.

It is proposed to characterize the airplane of this invention by a fuselage and a pair of wings extending laterally from the sides of said fuselage and continuing into rearwardly and laterally extending tip sections.

Still further the invention proposes to provide said airplane with ailerons located at and on certain parts thereof. It is also proposed to provide a landing gear arranged in a certain way.

Another object of the invention resides in the provision of means whereby the laterally and rearwardly extending tip sections of the wings may be angularly adjusted. It is further proposed to provide mechanism for automatically re-balancing the airplane for each adjustment of the wings.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective plan view of an airplane constructed in accordance with this invention.

Fig. 2 is a bottom view of the airplane shown in Fig. 1.

Fig. 3 is a side elevational view of the airplane.

Fig. 4 is a front elevational view thereof.

Figure 5:
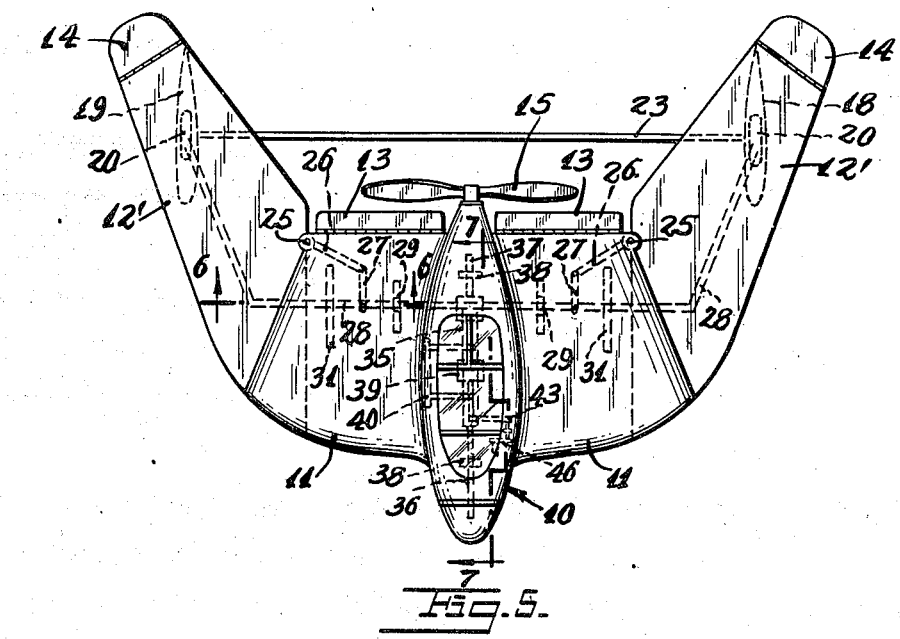
Fig. 5 is a plan view of an airplane constructed in accordance with a modified form of this invention.

The airplane, in accordance with this invention, includes a fuselage 10 of any design and construction. A pair of wings 11 extend laterally from the sides of the fuselage 10 and have rearwardly and laterally extending tip sections 12. Preferably, these tip sections 12 extend rearwards at substantially 60° angles, as may be clearly seen from an inspection of Fig. 2. Ailerons 13 are mounted upon the rear edges of the wings 11. Additional ailerons 14 are mounted upon the rear edges of the tip sections 12. The airplane is provided with a pusher type motor driven propeller 15.

The airplane is provided with a landing gear 16. This landing gear has a front section 17 mounted on the bottom of the fuselage 10 and rear sections 18, 19 mounted on the bottom of said tip sections 12. Each of the sections of the landing gear is provided with the usual wheel 20. The rear sections 18 and 19 of the landing gear are provided with rudders 21. The usual controls, not shown on the drawings, must be provided for working the ailerons and rudders in the usual way. As these constructions form no part of the invention they are not illustrated nor further described.

An important feature of the new airplane construction resides in the fact that because the tip sections 12 of the wings extend rearwards and laterally the necessity for a tail has been eliminated. Furthermore, because of this arrangement of the wings the airplane will be nose dive proof.

Figure 6:
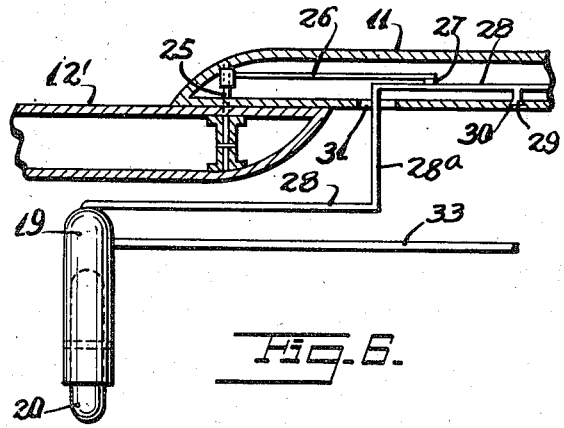
Fig. 6 is a fragmentary enlarged sectional view taken on the line 6—6 of Fig. 5.
Figure 7:
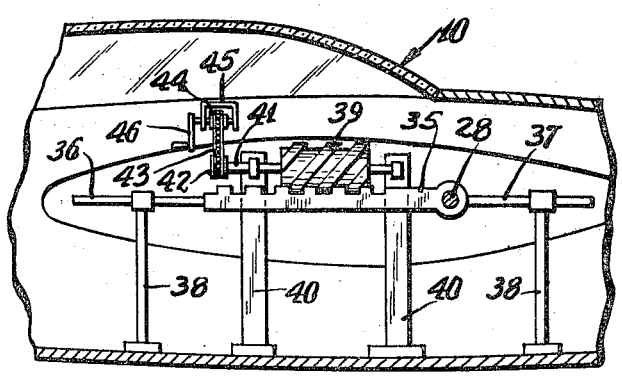
Fig. 7 is a fragmentary enlarged sectional view taken on the line 7—7 of Fig. 6.

In Figs. 5 to 7, inclusive, a modified form of the invention has been disclosed which distinguishes from the prior form in the fact that means has been provided for pivoting the tip section of the wings forwards and outwards and simultaneously moving the rear sections of the landing gear rearwards when the tip sections are adjusted. More specifically, this means includes tip sections 12' which are made separate from the side wings 11. The tip sections 12' are pivotally connected to the wings 11 by pintles 25 located at the junction of the rear edges thereof. Each pintle 25 is provided with a radially extending arm 26, which are pivotally connected with links 27. These links 27 extend forwards and pivotally connect with a frame 28.

The frame 28 is provided with slides 29 slidably engaging tracks 30 formed in the wings 11. The frame 28 is located within the wings 11 and is provided with portions 28ª which extend out from longitudinally extending slots 31 formed in the bottom faces of the wings 11. These extending portions 28ª extend rearwards and support the rear landing gear sections 18 and 19. A brace rod 33 connects the landing gear sections 18 and 19 together to reinforce them.

A rack arm 35 is connected with the frame 28 and is slidably supported by front and rear rods 36 and 37, respectively, slidably engaging standards 38. The rack 35 is engaged by a worm 39 which is rotatively supported in standards 40. The worm 39 is provided with an operator shaft 41 provided with a sprocket 42 engaged by a chain 43 engaging over a sprocket 44 rotatively supported in a bracket 45. The sprocket 44 is connected with an operator handle 46.

When the handle 46 is turned the rack 35 will indirectly be moved forwards or rearwards, and will correspondingly move the frame 28. This motion of the frame 28 is communicated by the links 27 and arms 26 to pivot the pintles 25 which correspondingly pivot the wing tips 12'. When the wing tips 12' move forwards and outwards, the center of gravity of the airplane will be shifted forwards and this shifting will be counterbalanced by the fact that the rear landing gear sections 18 and 19 will be automatically moved rearwards because they are indirectly connected with the frame 28 which moves rearwards when the wing tips 12' pivot forwards and outwards. The various parts will be so designed that the balance of the airplane is always maintained for the various positions of the wing tips 12'.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An airplane having a fuselage with a pair of laterally extending wings and a landing wheel on the bottom front end of said fuselage, rearwardly and laterally extending wing tip sections continuing from the ends of said wings, said wing tip sections being pivotally mounted on the back outer corners of said wings to be movable outwards and forwards relative to said wings, spaced rear landing wheels disposed beneath said wing tip sections, a frame slidably mounted within said wings and having ends extended from said wings and rearwards beneath said wing tip sections, means mounting said rear landing wheels thereon, means connecting said wing tip sections to the portion of said frame disposed within said wings to pivot said wing tip sections outwards and forwards relative to said wings and to simultaneously move said rear landing wheels rearwards relative to said fuselage.

2. An airplane having a fuselage with a pair of laterally extending wings and a landing wheel on the bottom front end of said fuselage, rearwardly and laterally extending wing tip sections continuing from the ends of said wings, said wing tip sections being pivotally mounted on the back outer corners of said wings to be movable outwards and forwards relative to said wings, spaced rear landing wheels disposed beneath said wing tip sections, a frame slidably mounted within said wings and having ends extended from said wings and rearwards beneath said wing tip sections, means mounting said rear landing wheels thereon, means connecting said wing tip sections to the portion of said frame disposed within said wings to pivot said wing tip sections outwards and forwards relative to said wings and to simultaneously move said rear landing wheels rearwards relative to said fuselage, said slidable mounting of said frame, comprising slides formed on said frame and engaging complementary tracks formed with said wings.

3. An airplane having a fuselage with a pair of laterally extending wings and a landing wheel on the bottom front end of said fuselage, rearwardly and laterally extending wing tip sections continuing from the ends of said wings, said wing tip sections being pivotally mounted on the back outer corners of said wings to be movable outwards and forwards relative to said wings, spaced rear landing wheels disposed beneath said wing tip sections, a frame slidably mounted within said wings and having ends extended from said wings and rearwards beneath said wing tip sections, means mounting said rear landing wheels thereon, means connecting said wing tip sections to the portion of said frame disposed within said wings to pivot said wing tip sections outwards and forwards relative to said wings and to simultaneously move said rear landing wheels rearwards relative to said fuselage, said slidable mounting of said frame, comprising slides formed on said frame and engaging complementary tracks formed with said wings, said first means, comprising arms having one of their ends fixedly attached to said wing tip sections concentric with their pivot points and having their free ends extended radially thereof into said wings, and links connecting the free ends of said arms to spaced points on said frame.

4. An airplane having a fuselage with a pair of laterally extending wings and a landing wheel on the bottom front end of said fuselage, rearwardly and laterally extending wing tip sections continuing from the ends of said wings, said wing tip sections being pivotally mounted on the back outer corners of said wings to be movable outwards and forwards relative to said wings, spaced rear landing wheels disposed beneath said wing tip sections, a frame slidably mounted within said wings and having ends extended from said wings and rearwards beneath said wing tip sections, means mounting said rear landing wheels thereon, means connecting said wing tip sections to the portion of said frame disposed within said wings to pivot said wing tip sections outwards and forwards relative to said wings and to simultaneously move said rear landing wheels rearwards relative to said fuselage, said latter means, comprising a rack arm mounted on said frame and slidably supported, a rotatively supported worm meshing with said rack, and means for manually rotating said worm to move said rack to correspondingly move said frame.

5. An airplane having a fuselage with a pair of laterally extending wings and a landing wheel on the bottom front end of said fuselage, rearwardly and laterally extending wing tip sections continuing from the ends of said wings, said wing tip sections being pivotally mounted on the back outer corners of said wings to be movable outwards and forwards relative to said wings, spaced rear landing wheels disposed beneath said wing tip sections, a frame slidably mounted within said wings and having ends extended from said wings and rearwards beneath said wing tip sections, means mounting said rear landing wheels thereon, means connecting said wing tip sections to the portion of said frame disposed within said wings to pivot said wing tip sections outwards and forwards relative to said wings and to simultaneously move said rear landing wheels rearwards relative to said fuselage, said latter means, comprising a rack arm mounted on said frame and slidably supported, a rotatively supported worm meshing with said rack, and means for manually rotating said worm to move said rack to correspondingly move said frame, said slidable supporting of said rack arm, comprising rods extending from the ends of said rack and slidably extended through fixedly mounted support brackets.

6. An airplane having a fuselage with a pair of laterally extending wings and a landing wheel on the bottom front end of said fuselage, rearwardly and laterally extending wing tip sections continuing from the ends of said wings, said wing tip sections being pivotally mounted on the back outer corners of said wings to be movable outwards and forwards relative to said wings, spaced rear landing wheels disposed beneath said wing tip sections, a frame slidably mounted within said wings and having ends extended from said wings and rearwards beneath said wing tip sections, means mounting said rear landing wheels thereon, means connecting said wing tip sections to the portion of said frame disposed within said wings to pivot said wing tip sections outwards and forwards relative to said wings and to simultaneously move said rear landing wheels rearwards relative to said fuselage and a brace rod extended between the inner faces of said rear landing wheels.

CARLOS ORTEGA.